United States Patent
Schwartzman et al.

(10) Patent No.: US 6,888,883 B1
(45) Date of Patent: May 3, 2005

(54) METHOD AND APPARATUS FOR REDUCING NOISE LEAKAGE FROM A CABLE MODEM

(75) Inventors: Alejandro H. Schwartzman, San Jose, CA (US); Charles J. Naegeli, Montara, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 09/396,303

(22) Filed: Sep. 15, 1999

Related U.S. Application Data (63) Continuation-in-part of application No. 09/344,037, filed on Jun. 25, 1999, now abandoned.

(51) Int. Cl.[7] ................................. H04B 1/38
(52) U.S. Cl. ..................................... 375/222
(58) Field of Search ................ 375/219, 222, 375/285; 725/105, 111, 109, 121, 124, 125, 128, 127, 107, 131; 348/614, 725, 731, 726

(56) References Cited

U.S. PATENT DOCUMENTS

| | | | | |
|---|---|---|---|---|
| 4,528,663 A | * | 7/1985 | Citta .......................... | 370/229 |
| 4,810,898 A | * | 3/1989 | Rocci et al. ................ | 307/115 |
| 5,742,713 A | * | 4/1998 | Sanders et al. ............ | 386/125 |
| 5,893,024 A | * | 4/1999 | Sanders et al. ............ | 725/125 |
| 5,937,330 A | * | 8/1999 | Vince et al. ................ | 725/125 |
| 6,049,693 A | * | 4/2000 | Baran et al. ................ | 725/124 |
| 6,094,211 A | * | 7/2000 | Baran et al. ................ | 348/614 |
| 6,160,571 A | * | 12/2000 | Wang ......................... | 725/127 |
| 6,181,365 B1 | * | 1/2001 | Nakagawara ............... | 725/111 |
| 6,307,593 B1 | * | 10/2001 | Bowyer et al. ............. | 348/461 |
| 6,321,384 B1 | * | 11/2001 | Eldering ..................... | 455/307 |
| 6,662,135 B1 | * | 12/2003 | Burns et al. ................ | 702/120 |

OTHER PUBLICATIONS

Website printout from www.anadigics.com, entitled ANADIGICS Reverse Amplifier Drives Internet Enabled CATV Systems, 2 pages.

Production Description for ARA1400S12 CATV Reverse Amplifier with Step Attenuator Advanced Product Information, Rev. 1, by ANADIGICS, 8 pages.

* cited by examiner

*Primary Examiner*—Tesfaldet Bocure
*Assistant Examiner*—Khanh cong Tran
(74) *Attorney, Agent, or Firm*—Beyer Weaver & Thomas LLP (57) ABSTRACT

Apparatus and methods are disclosed for reducing noise leakage on the upstream channel from a cable modem. Noise leakage from cable modems, such as from a persistently enabled amplifier or other components in the modem, can accumulate on an upstream channel and reduce the overall signal-to-noise ratio of signals sent to the headend. In order to significantly reduce such noise leakage and to provide termination of the cable plant in the modem when the modem is not transmitting data, a cable modem arranged to improve its isolation is disclosed. The modem contains an upstream transmitter having a control line on which the upstream transmitter can emit a control signal. The modem also includes a switch component capable of being enabled and disabled by the control signal on the control line. The control signal from the upstream transmitter to the switch component enables the switch component thereby allowing a data signal to be transmitted on an upstream channel. The switch component includes two switches. One switch is a series switch used to enable and disable the transmission of data. Another switch is a shunt for providing termination of the cable plant. The cable modem also includes an amplifier for amplifying the data signal from the upstream transmitter before being transmitted on the upstream channel.

25 Claims, 7 Drawing Sheets

METHOD AND APPARATUS FOR REDUCING NOISE LEAKAGE FROM A CABLE MODEM

This application is a continuation-in-part of U.S. patent application Ser. No. 09/344,037, filed Jun. 25, 1999 now abandoned, having Alejandro H. Schwartzman and Charles J. Naegeli as inventors, and titled METHOD AND APPARATUS FOR REDUCING NOISE LEAKAGE FROM A CABLE MODEM. This application is incorporated herein by reference in its entirety and for all purposes.

BACKGROUND OF THE INVENTION

1. Field of the Invention

The present invention relates to transmitting data over existing cable television plants using cable modems. More specifically, it relates to reducing noise leakage from a cable modem when the modem is not transmitting data and providing matched termination to the cable plant whether or not the cable modem is active.

2. Discussion of Related Art

The cable TV industry has been upgrading its signal distribution and transmission infrastructure since the late 1980s. In many cable television markets, the infrastructure and topology of cable systems now include fiber optics as part of its signal transmission component. This has accelerated the pace at which the cable industry has taken advantage of the inherent two-way communication capability of cable systems. The cable industry is now poised to develop reliable and efficient two-way transmission of digital data over its cable lines at speeds orders of magnitude faster than those available through telephone lines, thereby allowing its subscribers to access digital data for uses ranging from Internet access to cablecommuting.

Originally, cable TV lines were exclusively coaxial cable. The system included a cable head end, i.e. a distribution hub, which received analog signals for broadcast from various sources such as satellites, broadcast transmissions, or local TV studios. Coaxial cable from the head end was connected to multiple distribution nodes, each of which could supply many houses or subscribers. From the distribution nodes, trunk lines (linear sections of coaxial cable) extended toward remote sites on the cable network. A typical trunk line is about 10 kilometers. Branching off of these trunk lines were distribution or feeder cables (40% of the system's cable footage) to specific neighborhoods, and drop cables (45% of the system's cable footage) to homes receiving cable television. Amplifiers were provided to maintain signal strength at various locations along the trunk line. For example, broadband amplifiers are required about every 2000 feet depending on the bandwidth of the system. The maximum number of amplifiers that can be placed in a run or cascade is limited by the build-up of noise and distortion. This configuration, known as tree and branch, is still present in older segments of the cable TV market.

With cable television, a TV analog signal received at the head end of a particular cable system is broadcast to all subscribers on that cable system. The subscriber simply needed a television with an appropriate cable receptor to receive the cable television signal. The cable TV signal was broadcast at a radio frequency range of about 60 to 700 MHz. Broadcast signals were sent downstream; that is, from the head end of the cable system across the distribution nodes, over the trunk line, to feeder lines that led to the subscribers. However, the cable system did not have installed the equipment necessary for sending signals from subscribers to the head end, known as return or upstream signal transmission. Not surprisingly, nor were there provisions for digital signal transmission either downstream or upstream.

In the 1980s, cable companies began installing optical fibers between the head end of the cable system and distribution nodes (discussed in greater detail with respect to FIG. 1 below). The optical fibers reduced noise, improved speed and bandwidth, and reduced the need for amplification of signals along the cable lines. In many locations, cable companies installed optical fibers for both downstream and upstream signals. The resulting systems are known as hybrid fiber-coaxial (HFC) systems. Upstream signal transmission was made possible through the use of duplex or two-way filters. These filters allow signals of certain frequencies to go in one direction and of other frequencies to go in the opposite direction. This new upstream data transmission capability allowed cable companies to use set-top cable boxes and allowed subscribers pay-per-view functionality, i.e. a service allowing subscribers to send a signal to the cable system indicating that they want to see a certain program.

In addition, cable companies began installing fiber optic lines into the trunk lines of the cable system in the late 1980s. A typical fiber optic trunk line can be up to 80 kilometers, whereas a typical coaxial trunk line is about 10 kilometers, as mentioned above. Prior to the 1990s, cable television systems were not intended to be general-purpose communications mechanisms. Their primary purpose was transmitting a variety of entertainment television signals to subscribers. Thus, they needed to be one-way transmission paths from a central location, known as the head end, to each subscriber's home, delivering essentially the same signals to each subscriber. HFC systems run fiber deep into the cable TV network offering subscribers more neighborhood specific programming by segmenting an existing system into individual serving areas between 500 to 2,000 subscribers. Although networks using exclusively fiber optics would be optimal, presently cable networks equipped with HFC configurations are capable of delivering a variety of high bandwidth, interactive services to homes for significantly lower costs than networks using only fiber optic cables.

Figure 1:
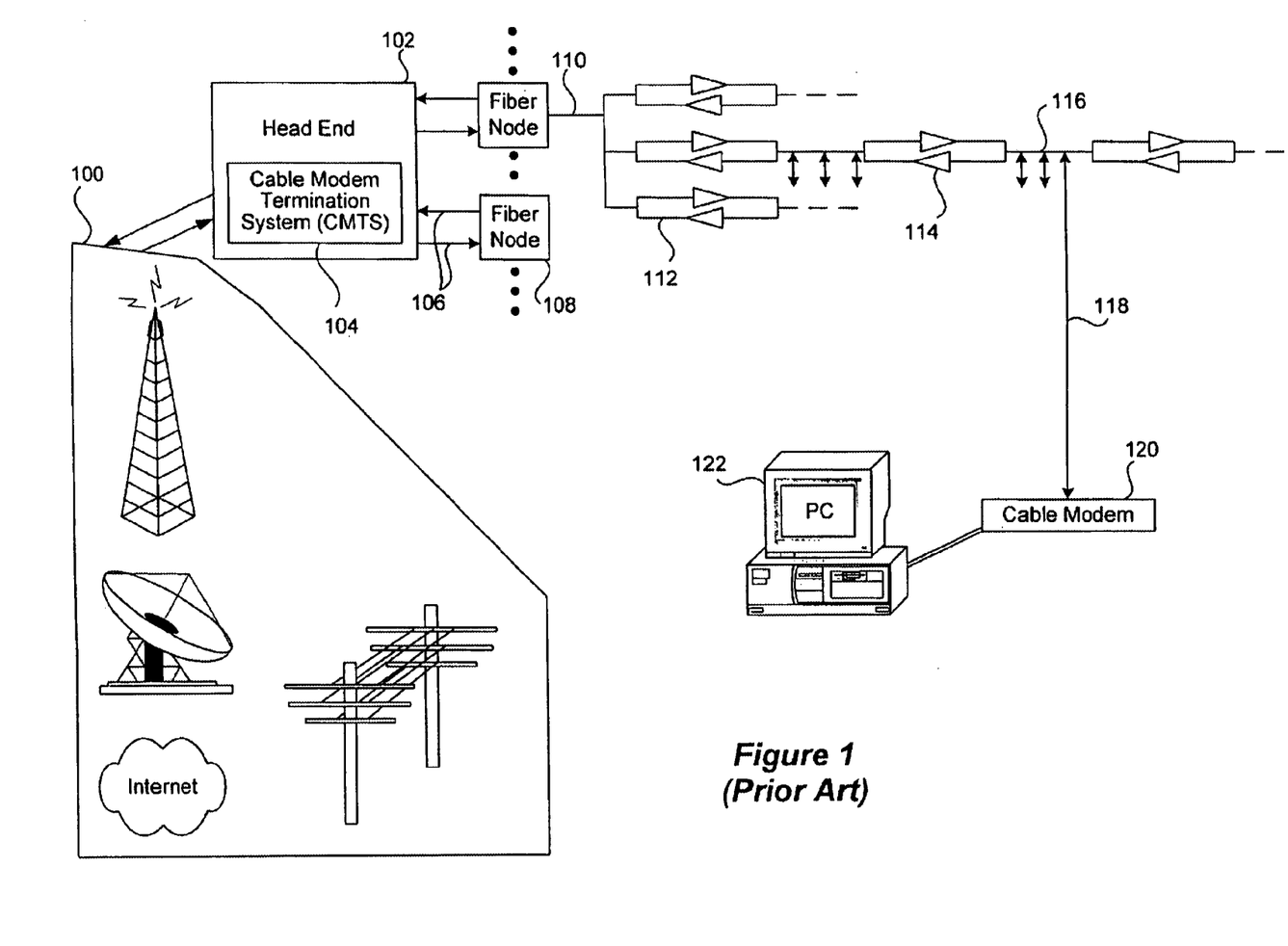
FIG. 1 is a block diagram of a two-way hybrid fiber-coaxial (HFC) cable system utilizing a cable modem for data transmission.

FIG. 1 is a block diagram of a two-way hybrid fiber-coaxial (HFC) cable system utilizing a cable modem for data transmission. It shows a head end 102 (essentially a distribution hub) which can typically service about 40,000 subscribers. Head end 102 contains a cable modem termination system (CMTS) 104 that is needed when transmitting and receiving data using cable modems. Head end 102 is connected through pairs of fiber optic lines 106 (one line for each direction) to a series of fiber nodes 108. Each head end can support normally up to 80 fiber nodes. Pre-HFC cable systems used coaxial cables and conventional distribution nodes. Since a single coaxial cable was capable of transmitting data in both directions, one coaxial cable ran between the head end and each distribution node. In addition, because cable modems were not used, the head end of pre-HFC cable systems did not contain a CMTS. Returning to FIG. 1, each of the fiber nodes 108 is connected by a coaxial cable 110 to two-way amplifiers or duplex filters 112 which permit certain frequencies to go in one direction and other frequencies to go in the opposite direction (frequency ranges for upstream and downstream paths are discussed below). Each fiber node 108 can normally service up to 500 subscribers. Fiber node 108, coaxial cable 110, two-way amplifiers 112, plus distribution amplifiers 114 along trunk line 116, and subscriber taps, i.e. branch lines 118, make up the coaxial distribution system of an HFC system. Subscriber tap 118 is connected to a cable modem 120. Cable modem 120 is, in turn, connected to a subscriber computer 122.

Recently, it has been contemplated that HFC cable systems could be used for two-way transmission of digital data. The data may be Internet data, digital audio, or digital video data, in MPEG format, for example, from one or more external sources 100. Using two-way HFC cable systems for transmitting digital data is attractive for a number of reasons. Most notably, they provide up to a thousand times faster transmission of digital data than is presently possible over telephone lines. However, in order for a two-way cable system to provide digital communications, subscribers must be equipped with cable modems, such as cable modem 120. With respect to Internet data, the public telephone network has been used, for the most part, to access the Internet from remote locations. Through telephone lines, data is typically transmitted at speeds ranging from 2,400 to 33,600 bits per second (bps) using commercial (and widely used) data modems for personal computers. Using a two-way HFC system as shown in FIG. 1 with cable modems, data may be transferred at speeds up to 10 million bps. Table 1 is a comparison of transmission times for transmitting a 500 kilobyte image over the Internet.

TABLE 1

Time to Transmit a Single 500 Kbytes Image

| Telephone Modem (28.8 KBPS) | 6–8 minutes |
| ISDN Line (64 KBPS) | 1–1.5 minutes |
| Cable Modem (10 Mbps) | 1 second |

Furthermore, subscribers can be fully connected twenty-four hours a day to services without interfering with cable television service or phone service. The cable modem, an improvement of a conventional PC data modem, provides this high speed connectivity and is, therefore, instrumental in transforming the cable system into a full service provider of video, voice and data telecommunications services.

As mentioned above, the cable industry has been upgrading its coaxial cable systems to HFC systems that utilize fiber optics to connect head ends to fiber nodes and, in some instances, to also use them in the trunk lines of the coaxial distribution system. In way of background, optical fiber is constructed from thin strands of glass that carry signals longer distances and faster than either coaxial cable or the twisted pair copper wire used by telephone companies. Fiber optic lines allow signals to be carried much greater distances without the use of amplifiers (item 114 of FIG. 1). Amplifiers decrease a cable system's channel capacity, degrade the signal quality, and are susceptible to high maintenance costs. Thus, distribution systems that use fiber optics need fewer amplifiers to maintain better signal quality.

Digital data on the upstream and downstream channels is carried over radio frequency (RF) carrier signals. Cable modems are devices that convert digital data to a modulated RF signal and convert the RF signal back to digital form. The conversion is done at two points: at the subscriber's home by a cable modem and by a CMTS located at the head end. The CMTS converts the digital data to a modulated RF signal which is carried over the fiber and coaxial lines to the subscriber premises. The cable modem then demodulates the RF signal and feeds the digital data to a computer. On the return path, the operations are reversed. The digital data is fed to the cable modem which converts it to a modulated RF signal. Once the CMTS receives the RF signal, it demodulates it and transmits the digital data to an external source.

As mentioned above, cable modem technology is in a unique position to meet the demands of users seeking fast access to information services, the Internet and business applications, and can be used by those interested in cable-commuting (a group of workers working from home or remote sites whose numbers will grow as the cable modem infrastructure becomes increasingly prevalent). Not surprisingly, with the growing interest in receiving data over cable network systems, there has been an increased focus on performance, reliability, and improved maintenance of such systems. In sum, cable companies are in the midst of a transition from their traditional core business of entertainment video programming to a position as a full service provider of video, voice and data telecommunication services. Among the elements that have made this transition possible are technologies such as the cable modem.

A problem common to upstream data transmission on cable systems, i.e. transmissions from the cable modem in the home to the head end, is ingress noise at the head end which lowers the signal-to-noise ratio, also referred to as carrier-to-noise ratio. Ingress noise can result from numerous internal and external sources. Sources of noise internal to the cable system can include cable television network equipment, subscriber terminals (televisions, VCRs, cable modems, etc.), intermodular signals resulting from corroded cable termini, and core connections. Significant sources of noise external to the cable system include home appliances, welding machines, automobile ignition systems, and radio broadcast. All of these ingress noise sources enter the cable system through defects in the coaxial cable line, which acts essentially as a long antenna. Ultimately, when cable systems are entirely optical fiber, ingress noise will be a far less significant problem. However, until that time, ingress noise is and will continue to be a problem with upstream transmissions.

Figure 2:
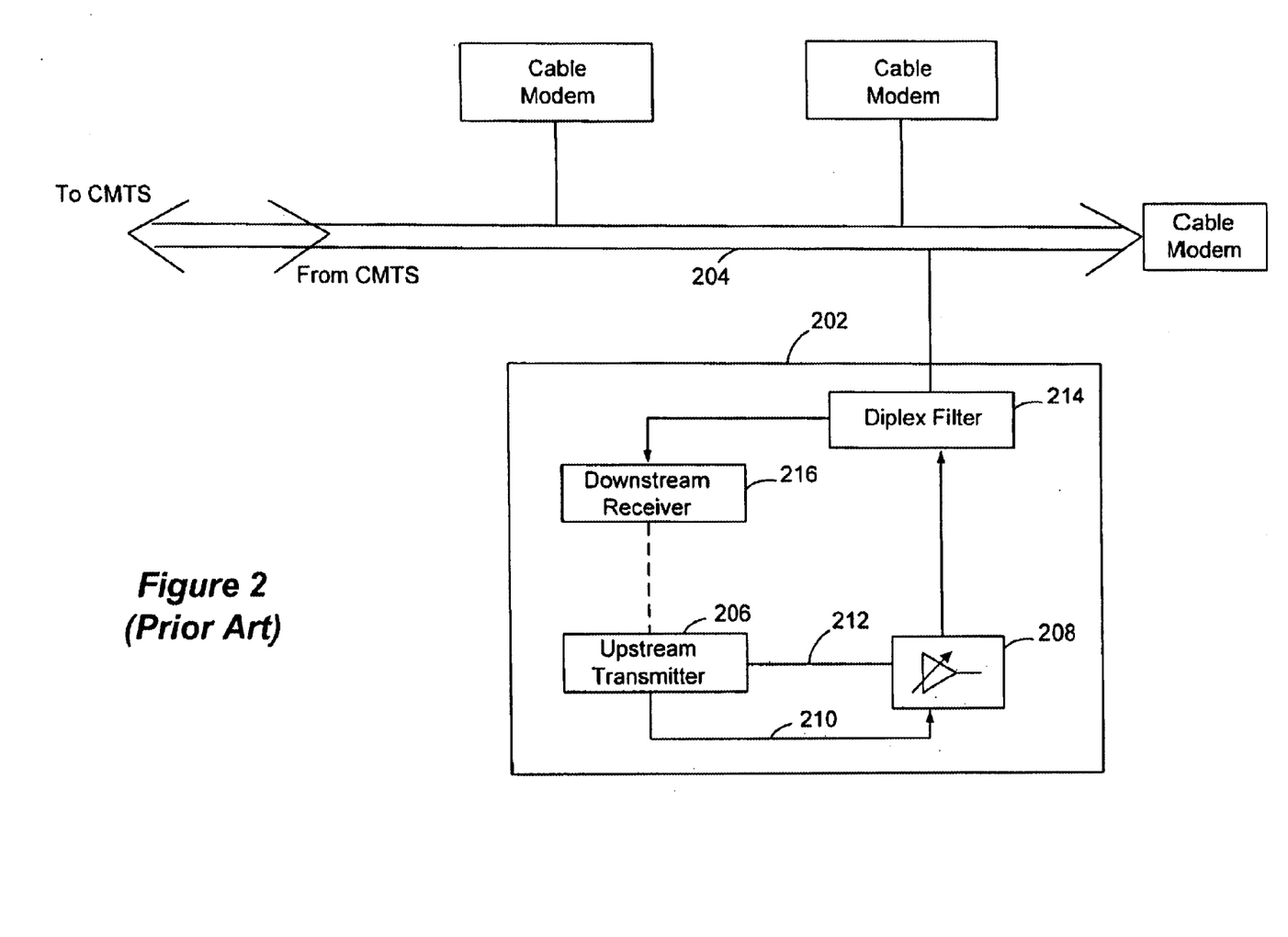
FIG. 2 is a block diagram showing relevant components of a cable modem and the subscriber end of a cable plant.

In addition to ingress noise (external sources of noise to a cable plant), another source of noise on the upstream channel is transient noise leakage from a cable modem itself. A cable modem contains, among several other components, an upstream transmitter coupled with a variable amplifier. FIG. 2 is a block diagram of a cable modem and subscriber end of a cable plant. A cable modem 202 transmits data on upstream channel 204. An upstream transmitter 206 is connected to an amplifier 208 by a control line 210 which allows transmitter 206 to enable or disable amplifier 208 (the two components are also connected via a data line 212 for the transmission of data packets). When cable modem 202 is turned on, upstream transmitter 206 enables amplifier 208 and when it is turned off, the transmitter disables the amplifier.

A problem occurs because control line 210 often transmits control messages from transmitter 206 to amplifier 208 at a speed that does not give the amplifier sufficient time to enable or turn on. This can cause interference or collision of data packets during transmission. For example, upstream transmitter 206 informs amplifier 208 via the control line 210 that the amplifier should expect data in a certain amount of time, such as in two microseconds. Amplifier 208 then has two microseconds to enable itself before it begins receiving data. With most variable amplifiers, the "warning" time is typically not sufficient to prepare for receiving data packets. Consequently, data packet loss can occur. The amplifier then transmits the data through a diplex filter 214 which acts as an entry/exit point for data for cable modem 202. Also shown is a downstream receiver 216 for receiving data on the downstream channel through diplex filter 214.

Because variable amplifier 208 in a cable modem often cannot transmit data packets at a sufficient speed, it is kept enabled via the control line, even when the cable modem is not transmitting data. By keeping the variable amplifier within the cable modem enabled in such a manner, a cable modem can create noise as a result of leakage from upstream transmitter 206 and variable amplifier 208. Ideally, when a cable modem is turned off and the variable amplifier is disabled, there is complete isolation and no noise emanates from the modem. Complete isolation implies there is no leakage of power from the amplifier and, thus, no noise created by the modem on the upstream channel. However, it is difficult to obtain complete isolation for a cable modem.

Because control line 210 keeps the variable amplifier persistently enabled as instructed by upstream transmitter 206, there is typically a small amount of leakage at all times. While power leakage from one or two cable modems is not noticeable, a significant noise problem occurs when many modems in a service area having hundreds of cable modems, often referred to as a system of modems, have leakage. Leakage from the modems accumulates at the head end and raises the noise floor of the upstream spectrum. Generally, leakage from all the cable modems accumulates arithmetically to increase the noise floor of the entire upstream channel. This reduces the overall signal-to-noise ratio of the upstream spectrum. This, in turn, significantly limits the number of cable modems able to use an upstream channel in accordance with the DOCSIS standard which requires that the signal-to-noise ratio be no less than 44 dB.

Presently, a solution for reducing noise on an upstream spectrum is to partition a service area so that the new service areas contain fewer cable modems. By partitioning a service area, an upstream channel used by one of the new service areas will have less accumulated noise from the cable modem themselves. However, this solution is impractical and inefficient as service areas grow and the number of cable modem subscribers increases.

Therefore, it would be desirable to be able to reduce or eliminate leakage from a cable modem thereby lowering the cumulative noise floor of the upstream channel. It would also be desirable to achieve this increased isolation of a cable modem without having to keep the modem or any components within the modem enabled at all times, even when not in use.

SUMMARY OF THE INVENTION

According to the present invention apparatus and methods are disclosed for reducing noise leakage on the upstream channel from a cable modem. In one aspect of the invention a cable modem arranged to improve isolation thereby reducing noise leakage on the upstream channel is disclosed. The cable modem contains an upstream transmitter having a control line on which the upstream transmitter can emit a control signal. Also in the modem is a switch component capable of being enabled and disabled by the control signal on the control line. The control signal from the upstream transmitter to the switch component enables the switch component thereby allowing a data signal to be transmitted on an upstream channel. The cable modem also includes an amplifier for amplifying the data signal from the upstream transmitter before being transmitted on the upstream channel.

In one embodiment a cable modem the switch component includes two switches. One switch is a series switch used to enable and disable the transmission of data. Another switch is a shunt for providing termination of the cable plant. In another embodiment the switch component is integrated in a variable amplifier in the cable modem. In yet another embodiment the switch component is a separate component in the cable modem.

In another aspect of the invention a method of reducing noise leakage from a cable modem onto a cable plant is described. A switch component is activated when the upstream transmitter in the cable modem transmits a data signal. A data signal is then transmitted on the upstream channel. Once the data signal is transmitted, the switch component is deactivated or disabled thereby reducing noise leakage when the cable modem is not actively transmitting and terminating noise from the cable plant when the cable modem is not powered.

In one embodiment the switch component is activated by enabling a control line which causes a series switch to close thereby allowing a data signal to reach a diplex filter when the cable modem is ready to transmit data and opening a shunt switch. In another embodiment the switch component is deactivated when no data is being transmitted upstream by closing the shunt switch thereby terminating the cable plant. The series switch is opened when the shunt is closed thereby disconnecting a data signal path from the upstream transmitter to a diplex filter. In yet another embodiment, it is determined whether the amplifier in the cable modem can enable at a sufficient speed to not cause data packet collisions when being transmitted on the cable plant, and activating only the switch component if the amplifier cannot enable at a sufficient speed.

BRIEF DESCRIPTION OF THE DRAWINGS

The invention will be better understood by reference to the following description taken in conjunction with the accompanying drawings in which.

DETAILED DESCRIPTION

Reference will now be made in detail to a preferred embodiment of the invention. An example of the preferred embodiment is illustrated in the accompanying drawings. While the invention will be described in conjunction with a preferred embodiment, it will be understood that it is not intended to limit the invention to one preferred embodiment.

To the contrary, it is intended to cover alternatives, modifications, and equivalents as may be included within the spirit and scope of the invention as defined by the appended claims.

In accordance with one embodiment of the present invention, there is provided a device for reducing noise leakage from a cable modem when the cable modem is not actively transmitting and to properly terminate the cable plant when the cable modem is not in use, avoiding unwanted reflections, as described in the various figures. One way of reducing the accumulation of noise (i.e., prevent raising the noise floor) on the upstream channel for a group or system of cable modems is to prevent noise leakage from those cable modems when they are not in use. This can be accomplished by reducing noise leakage from the amplifier used in the cable modem by using a series switch and shunt switch as a conduit for transmission of data from the upstream transmitter to the upstream channel. These two switches can be enabled or disabled through a control line from the upstream transmitter.

Figure 3:
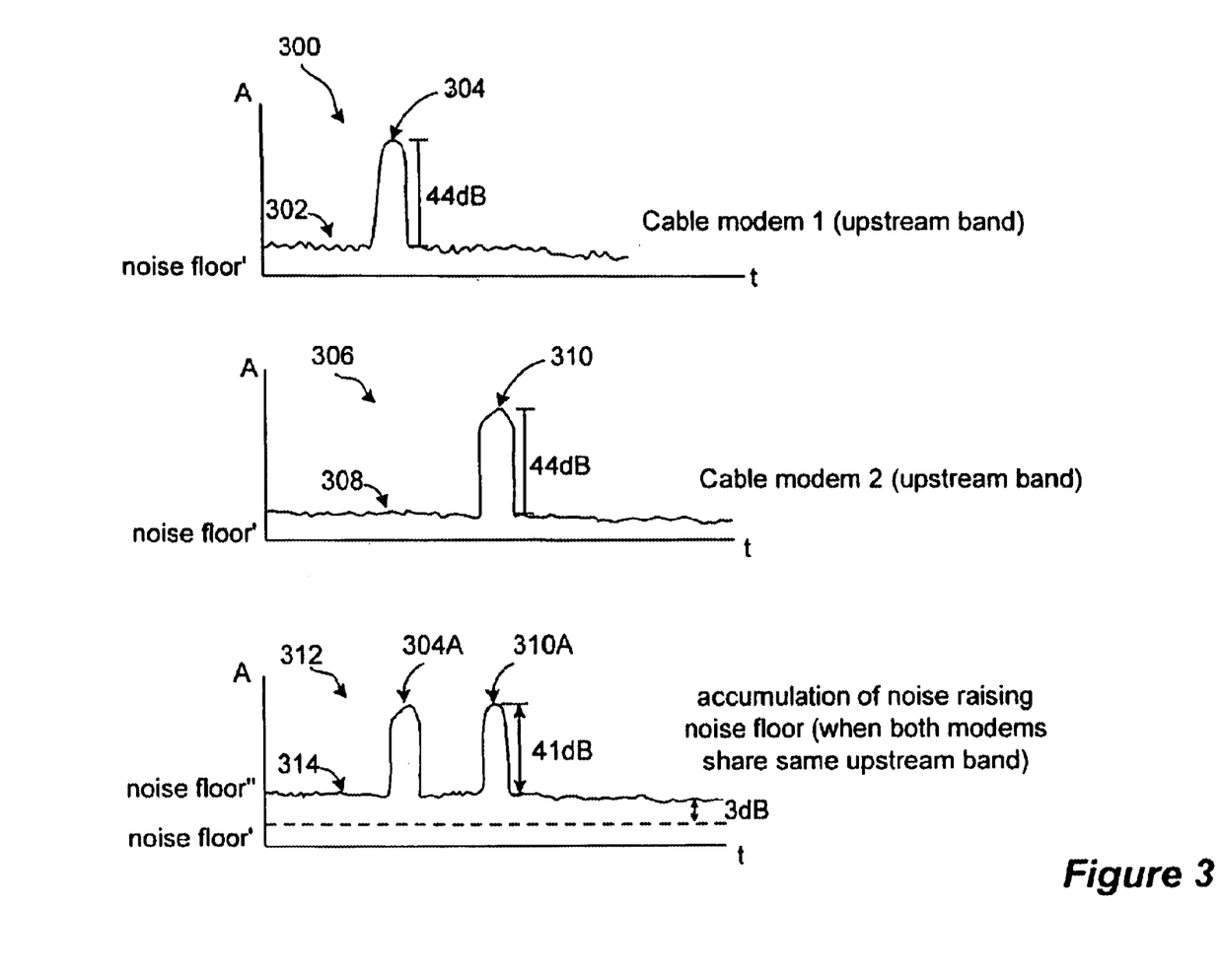
FIG. 3 shows a series of graphs displaying noise and signal levels of two cable modems and the accumulation of noise from those modems.

The accumulation of noise is further illustrated in FIG. 3 which shows a series of graphs displaying noise and signal levels of two cable modems (one per upstream channel) and the accumulation of noise from those modems. A signal/noise-time graph 300 shows a noise level and a signal burst of a first cable modem in one upstream frequency. A noise level 302 indicates noise emitted by the cable modem onto the upstream channel of the cable plant. The noise floor level is generally in the range of −60 dBc to −44 dBc (a cable modem transmitting data with a signal-to-noise ratio (SNR) of 44 dB will comply with the DOCSIS specification) The noise floor is created by leakage from a variable amplifier in the cable modem, described in greater detail below. A signal burst 304 indicates the transmission of a signal by the cable modem, specifically, the upstream transmitter. When a signal is transmitted, the signal-to-noise ratio increases significantly, 44 dB if the SNR is the minimum value specified by MCNS.

A second cable modem in the same system of modems as the first modem has a signal/noise-time graph 306 similar to graph 300. The second modem has a noise floor 308 and a signal burst 310 (typically sent at a different time than the signal sent by the first modem) similar to those of the first cable modem. It also has a noise floor in the range of −60 dBc to −44 dBc. A third graph 312 is an accumulation of signals 304 and 310 and noise floors 302 and 308 emitted by the first and second cable modems. A noise floor 314 is the accumulation of noise floor 302 and noise floor 308. It is higher than either one taken by itself; that is, the signal-to-noise ratio is lower than the signal-to-noise ratios of noise floors 302 or 308. As is known in the art, noise levels accumulate arithmetically, thereby raising the noise floor. In graph 312, noise floor 314 is about 3 dB higher than either individual noise floors 302 or 308. As the noise floor increases, the signal-to-noise ratios of the signals transmitted by the first and second cable modems, shown as signals 304A and 310A, decreases, in this case to 41 dB signal-to-noise ratio.

As the noise emitted by all cable modems in a system of modems accumulates, the noise floor builds and the signal-to-noise ratio of data transmissions by each of the modems decreases. As the number of modems grows, noise floor 314 can increase significantly thereby lowering the quality of upstream data transmission of each modem. For 16 QAM modulation on the upstream a minimum SNR of 24 dB is needed for adequate reception on the CMTS. This limits the number of cable modems per upstream to 100 cable modems if the SNR at the cable modem transmitter is 44 dB (10 log 100=20 dB; 44 dB−20 dB=24 dB which is the minimum required SNR). As is described in greater detail below, a pair of switches including a series switch and shunt switch of the present invention further isolates the cable modem thereby reducing noise leakage onto the upstream channel. It does this by connecting and disconnecting the transmission signal of the cable modem to the cable plant at a sufficiently high speed. Variable amplifiers typically used in cable modems are unable to operate at these high speeds.

Figure 4A:
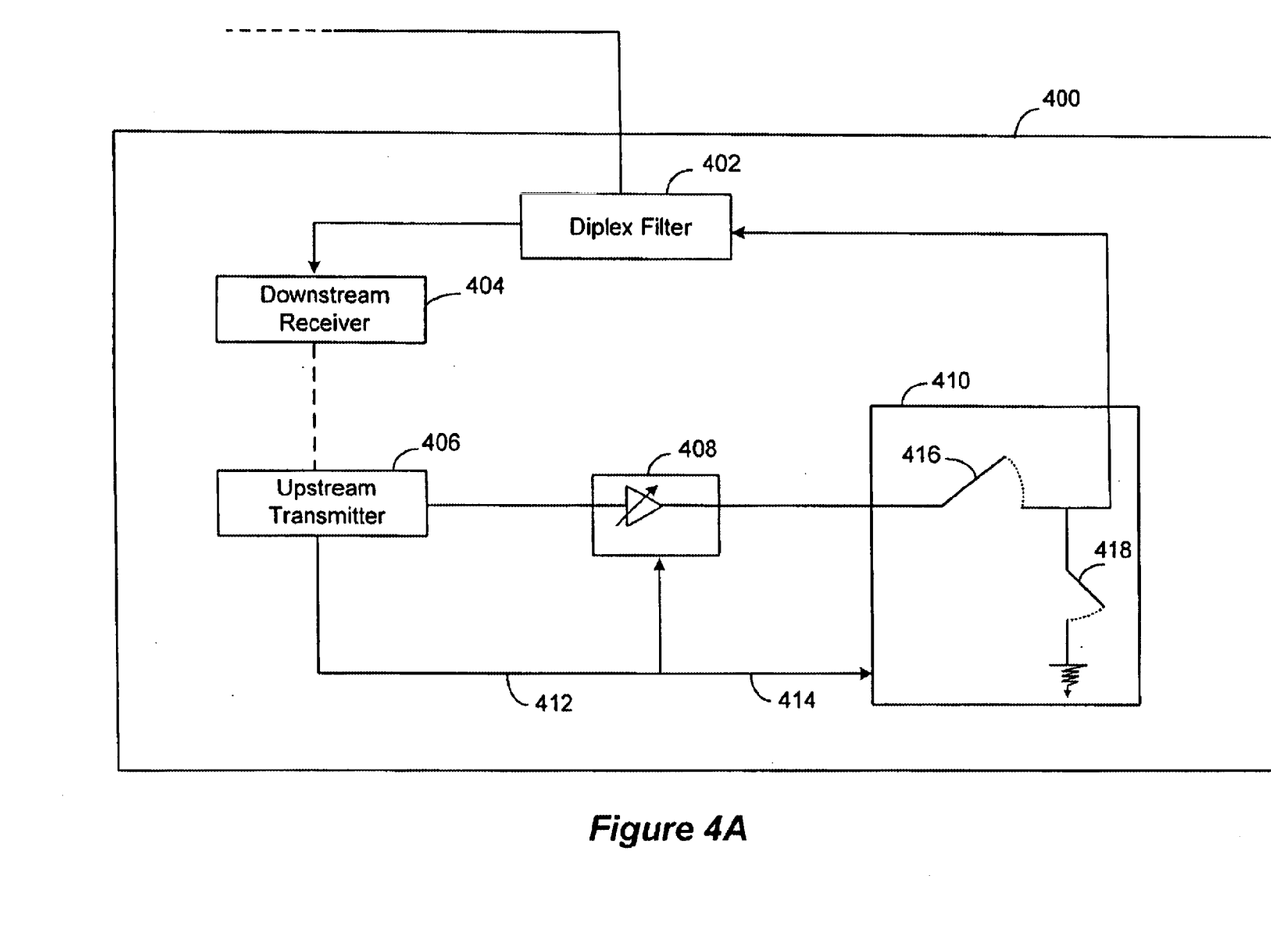
FIG. 4A is a block diagram depicting the placement and configuration of these switches for reducing noise leakage in accordance with one embodiment of the present invention.

In the described embodiment, the series and shunt switches are implemented within the cable modem but external to the variable amplifier. FIG. 4A is a block diagram depicting the placement and configuration of these switches for reducing noise leakage in accordance with one embodiment of the present invention. A cable modem 400 includes (among numerous other known component), a diplex filter 402, a downstream receiver 404, an upstream transmitter 406, a variable amplifier 408, a switch component 410, and a control line 412 (a segment of which is shown as a line 414). Cable modem 400 has other components such as a MAC unit and CPU, not shown. As is known in the field of cable modem and cable communications, all these components are commonly found in standard cable modems, with the exception of switch component 410 and extension of control line 412, shown as segment 414. Diplex filter 402 acts as an entry/exit gate for transmissions to and from the cable modem. Signals on the downstream are received by diplex filter 402 and processed by downstream receiver 404 and other components, such as a MAC unit and CPU. A signal intended to be sent on the upstream to the headend of the cable plant eventually goes through upstream transmitter 406. A signal from upstream transmitter 408 is amplified before being transmitted on the upstream by variable amplifier 408 whose operation is controlled by transmitter 406 via control line 412.

As mentioned above, noise leakage emanates from variable amplifier 408 being kept on at all times even when there is no signal burst. Variable amplifier 408 is enabled at all times because it is typically not fast enough to enable from an OFF position without causing data packet interference and collision. This is described in greater detail below. Switch component 410 is used to prevent noise leakage from a persistently enabled amplifier from reaching the upstream channel by alternating the opening and closing of two switches depending on whether there is a signal burst. In one embodiment of the present invention, a signal is transmitted to switch component 410 which is located outside variable amplifier 408 via control 412 and segment 414. Component 410 contains two switches, a series switch 416 and a shunt switch 418. These switches are controlled by signals sent via control line 412, specifically segment 414 from upstream transmitter 406.

When upstream transmitter 406 transmits a data signal, series switch 416 closes and shunt switch 418 opens. This allows the data signal to reach diplex filter 402 and be transmitted on the upstream channel. Before transmitter 406 sends a data signal, it sends a control signal via control line 412 to switch component 410 instructing series switch 416 to close and shunt 418 to open (as shown in FIG. 4A). These switches can open and close at speeds significantly higher than that of most variable amplifiers. For example, the switches can react in approximately 400 nanoseconds whereas most variable amplifiers cannot react faster than ten to forty microseconds. When there is no data signal transmission, series 416 is open (as shown in FIG. 4A) and shunt 418 is closed. By opening series 416, no signal or noise is transmitted or leaked from variable amplifier 410 to the upstream channel. Any leakage from the amplifier that is transmitted to the diplex filter is attenuated by the isolation of the switch (typically 40 dB). This results in a 40 dB attenuation of the noise contributed by each cable modem. However, by closing shunt 418, cable modem 400 can achieve close to "perfect termination" by terminating the 75 ohm cable plant impedance within an impedance of 75 ohms (matched impedance). Although some thermal noise results from this termination it is generally much lower than noise from the cable modem.

Figure 4B:
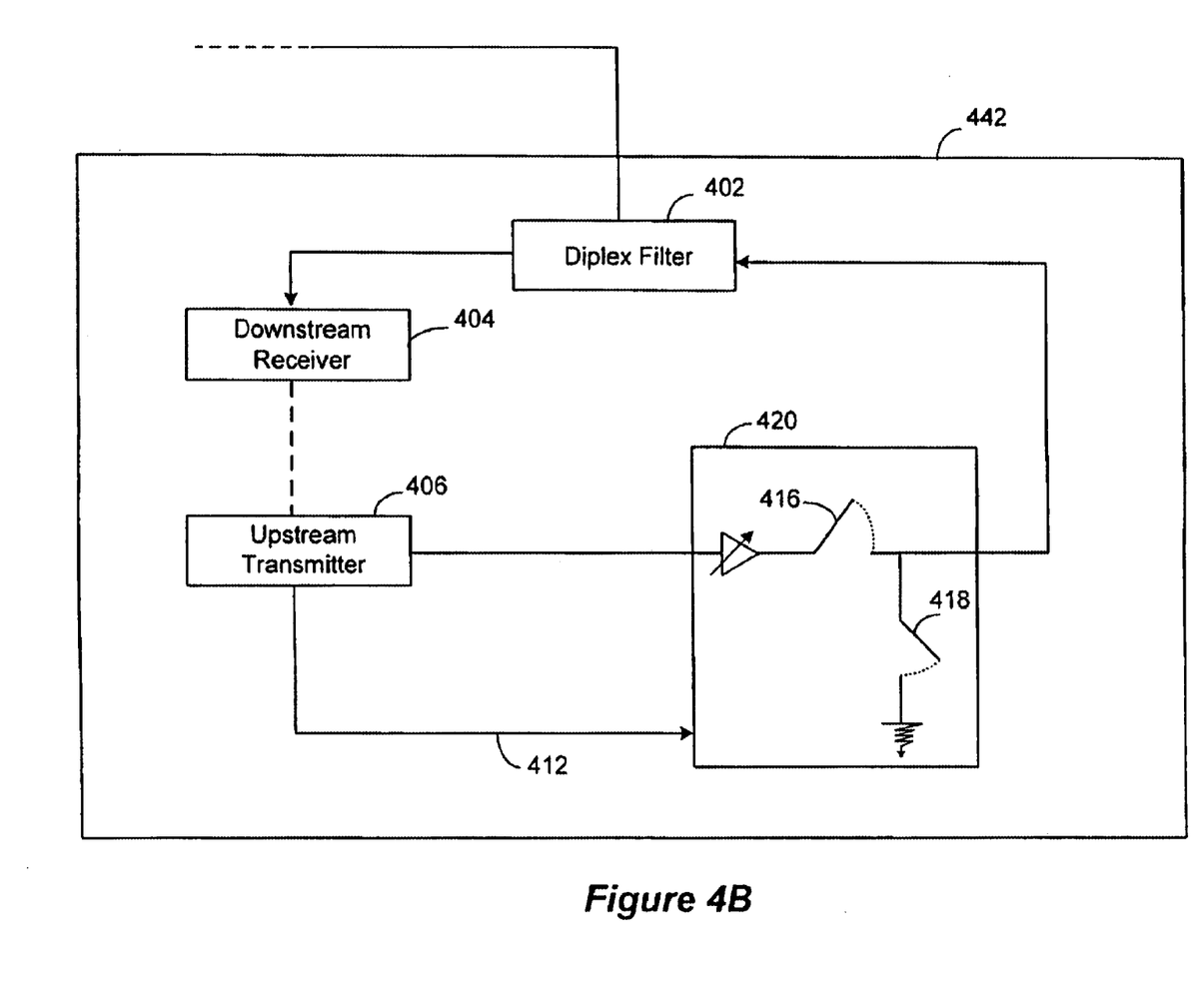
FIG. 4B is a block diagram depicting an alternative position of the switch component of the present invention.

FIG. 4B is a block diagram depicting an alternative position of the switch component in accordance with one embodiment of the present invention. A modified cable modem 422 contains an enhanced variable amplifier 420 used to amplify a signal from upstream transmitter 406. Other components in modem 422 are the same as those described in FIG. 4A. In contrast, amplifier 420 of FIG. 4B contains switch component 410, as originally shown in FIG. 4A. Control line 412 from transmitter 406 goes only to modified amplifier 420 and controls the amplifier as well as series switch 416 and shunt switch 418. Series switch 416 and shunt 418 are contained within variable amplifier 420. This embodiment is feasible if the variable amplifier is capable of switching the incorporated switch on and off fast enough. A process of opening and closing the series and shunt switches is described in greater detail in FIGS. 5 and 6.

Figure 5:
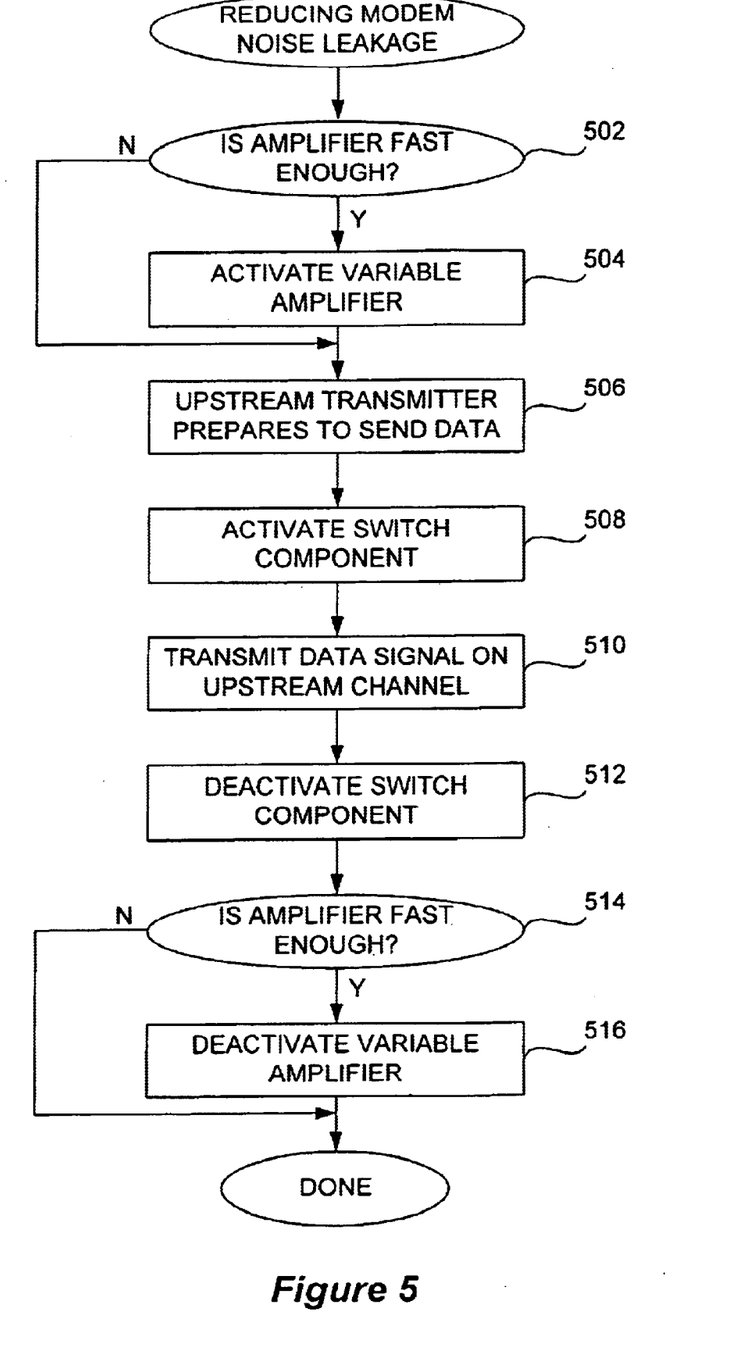
FIG. 5 describes a process of improving isolation of a cable modem thereby reducing noise leakage in accordance with one embodiment of the present invention.

FIG. 5 describes a process of improving isolation of a cable modem thereby reducing noise leakage in accordance with one embodiment of the present invention. A cable modem may typically leak noise in the range of 30 to 60 dBc down the desired signal, mostly in the form of transient noise emanating from an enabled variable amplifier. Series switch 416 and shunt 418 can be switched ON and OFF typically within a few hundred nanoseconds. In one embodiment variable amplifier 408, still needed to amplify data signal levels, is kept enabled at all times thereby eliminating the problem of data packet interference at the cost of constantly leaking noise.

At a step 502, it is determined, by virtue of the cable modem design, whether the speed of the variable amplifier is such that the amplifier should be kept ON or OFF. The speed of the variable amplifier is determined when the cable modem is designed. If the amplifier is not fast enough it is always kept in an activated state. At step 502 it is determined whether the amplifier is able to activate at a sufficient speed to accept data without causing data packet loss. If it is determined that the variable amplifier is not able to activate fast enough to receive the data without causing data loss, the variable amplifier is already activated and only the switch component alone is activated (as described in step 508). It is worth noting that one advantage to having the variable amplifier deactivated (i.e., not in an active state at all times) in conjunction with the switch component is that it provides a second layer of protection from noise leakage; that is, it further isolates the cable modem. In other embodiments, if the variable amplifier is generally expected not to be fast enough, it has to be kept on at all times. However, this is a constant source of noise and is a constant power drain by the cable modem.

If the variable amplifier can activate at a sufficient speed, at a step 504 the variable amplifier is enabled or activated using means well known in the electronic arts. The upstream transmitter sends a signal to the amplifier via a control line, shown as line 412 in FIGS. 4A and 4B, to activate. As mentioned above, variable amplifiers can sometimes activate in time and in other situations cannot. At a step 506 the upstream transmitter prepares to send a data signal on the upstream channel to the headend.

At a step 508 the upstream transmitter asserts or enables a control line to the switch component. By asserting the control line, the transmitter is instructing the amplifier and the two switches to expect a data signal shortly and to prepare to receive the data signal. This process is described in greater detail in FIGS. 6A and 6B. In the described embodiment the same signal from the transmitter goes to the variable amplifier and to the switch component.

At a step 510, the cable modem transmits a data signal on the upstream channel. Once the signal has been sent, at a step 512 the switch component is deactivated; that is, it is put in what may be referred to as non-transmission mode. The series switch is opened and the shunt is closed allowing for termination of the cable plant. This is done by having the upstream transmitter send a signal to the switch component to switch back to the deactivated state. At a step 514, the cable modem determines whether the variable amplifier is fast enough as was determined at step 502. If it is not fast enough, the variable amplifier was never activated and, thus, does not have to be deactivated, and the process is complete. If it is fast enough, the amplifier was activated at step 506, and is deactivated at a step 516, at which stage the process of reducing modem noise leakage is complete.

In the described embodiment, the variable amplifier is disabled or deactivated when not in use thereby adding to the isolation of the cable modem. This added layer of isolation is on top of the isolation affected primarily and most efficiently by the shunt switch being closed when a signal is not transmitted. In the described embodiment, by closing the shunt, the modem terminates the cable plant with 75 ohms. By terminating the cable plant or, more specifically, the upstream channel, a perfect impedence matching is achieved further avoiding unwanted reflections and disturbances. By activating the switch component to send data, the series switch is closed thereby allowing a signal to pass through to the diplex filter and onto the upstream channel. At the same time the shunt is opened since termination of the cable plant is not needed when transmitting a signal burst.

Figure 6A:
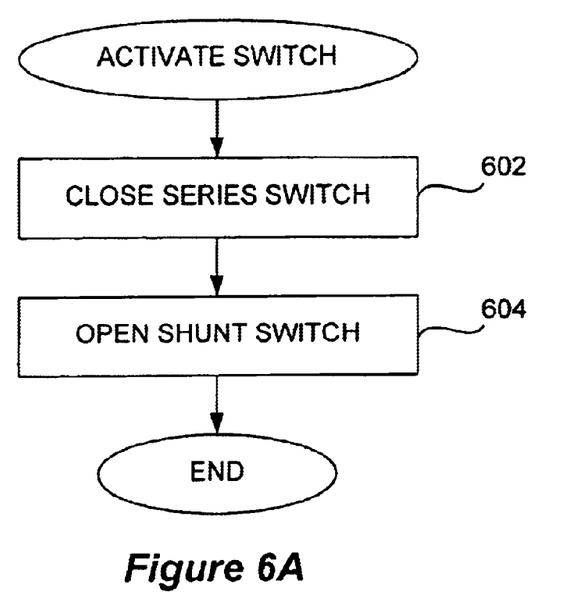
FIG. 6A is a flow diagram describing a process for activating the switch component in accordance with one embodiment of the present invention.
Figure 6B:
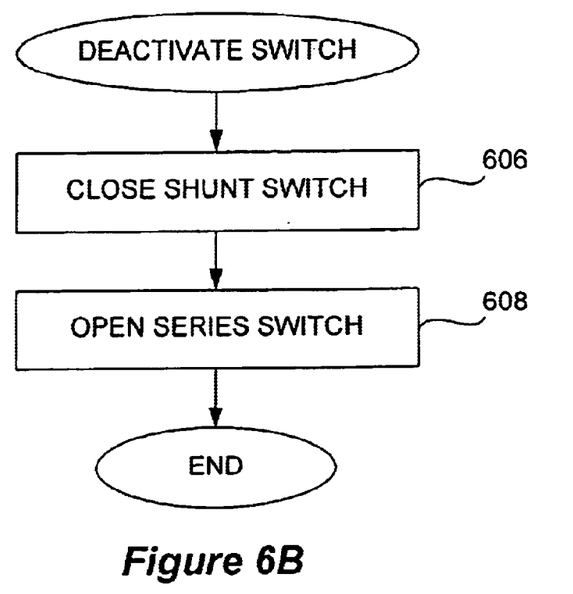
FIG. 6B is a flow diagram describing a reverse process in which the switch component is deactivated in accordance with one embodiment of the present invention.

FIG. 6A is a flow diagram describing a process for activating the switch component in accordance with one embodiment of the present invention. As mentioned above in step 510, when the switch component is activated, the series switch closes once it receives a signal from the upstream transmitter instructing it to prepare for receiving a data signal in a step 602. By closing the series switch, the signal can pass through to the diplex filter. Simultaneously, or close to the same time, the shunt switch is opened at a step 604. Similarly, FIG. 6B is a flow diagram describing a reverse process in which the switch component is deactivated in accordance with one embodiment of the present invention. The switch component is deactivated when the data signal has been transmitted and the upstream transmitter is no longer transmitting any signals. At a step 606 the shunt switch is closed thereby allowing termination of the cable plant and reducing noise leakage by the modem. As with step 604, the series switch is simultaneously opened or released thereby not permitting any data signals to be transmitted to the upstream channel, at which stage the process is complete.

Although the foregoing invention has been described in some detail for purposes of clarity of understanding, it will be apparent that certain changes and modifications may be practiced within the scope of the appended claims.

Furthermore, it should be noted that there are alternative ways of implementing both the process and apparatus of the present invention. For example, the switches can be incorporated into a suitable amplifier and be activated by the same control signals. In another example, a sufficiently fast-activating amplifier that is not kept on at all times can be used in conjunction with the switches for providing further isolation of the cable modem. Accordingly, the present embodiments are to be considered as illustrative and not restrictive, and the invention is not to be limited to the details given herein, but may be modified within the scope and equivalents of the appended claims.

What is claimed is:

1. A cable modem capable of reducing noise leakage on the upstream channel in a cable plant comprising:
   an upstream transmitter having a control line on which the upstream transmitter can emit a control signal;
   a switch component capable of being enabled and disabled by the control signal on the control line, such that the control signal from the upstream transmitter to the switch component enables the switch component thereby allowing a data signal to be transmitted on an upstream channel; and
   an amplifier configured to be controlled directly by the control signal for amplifying the data signal from the upstream transmitter before being transmitted on the upstream channel;
   wherein the upstream transmitter is configured to generate the control signal for implementing (i) a first mode of protection from noise leakage using only the switch if the amplifier cannot switch at a sufficient speed not to cause data loss, and (ii) a second mode of protection from noise leakage using both the amplifier and the switch component if the amplifier can switch at a sufficient speed not to cause data loss.

2. A cable modem as recited in claim 1 wherein the switch component includes a plurality of switches.

3. A cable modem as recited in claim 2 wherein the plurality of switches includes a first switch associated with transmission of the data signal.

4. A cable modem as recited in claim 2 wherein the plurality of switches includes a second switch associated with termination of the cable plant.

5. A cable modem as recited in claim 4 wherein the second switch is a shunt switch attached to a resistor.

6. A cable modem as recited in claim 1 wherein the switch component is contained in the amplifier.

7. A cable modem as recited in claim 6 wherein the amplifier is a variable amplifier.

8. A cable modem as recited in claim 1 when the switch component is not contained in any other component in the cable modem.

9. A cable modem as recited in claim 1 wherein the witch component is coupled by a data bus to a diplex filter.

10. A method of reducing noise leakage from a cable modem onto a cable plant, the method comprising:
    activating a switch component and an amplifier in the cable modem by sending a control signal from an upstream transmitter directly to the switch component and the amplifier when the upstream transmitter is ready to transmit a data signal upstream;
    transmitting the data signal on the upstream channel;
    deactivating the switch component and the amplifier by sending the control sigal from the upstream transmitter directly to the switch component and the amplifier after the data signal has been transmitted on the upstream channel thereby reducing noise leakage when the cable modem is not actively transmitting and reducing noise from the cable plant when the cable modem is not powered; and
    generating the control signal for implementing (i) a first mode of protection from noise leakage using only the switch if the amplifier cannot switch at a sufficient speed not to cause data loss, and (ii) a second mode of protection from noise leakage using both the amplifier and the switch component if the amplifier can switch at a sufficient speed not to cause data loss.

11. A method as recited in claim 10 wherein activating a switch component in the cable modem further includes asserting a control line.

12. A method as recited in claim 10 further comprising:
    closing a series switch within the switch component thereby allowing a data signal to each a diplex filter in the cable modem when the cable modem is ready to transmit a data signal on the upstream channel.

13. A method as recited in claim 12 further comprising:
    opening a shunt switch within the switch component when the series switch is closed.

14. A method as recited in claim 10 further comprising:
    closing a shunt switch within the switch component thereby terminating the cable plant when the cable modem is not transmitting a data signal on the upstream channel.

15. A method as recited in claim 14 further comprising:
    opening a series switch within the switch component thereby disconnecting a data signal path to a diplex filter when the shunt switch is closed.

16. A method as recited in claim 10 further comprising activating a variable amplifier to prepare for transmitting a data signal.

17. The method of claim 10 wherein activating the switch component and activating the amplifier are performed in a synchronized manner.

18. The method of clam 10 wherein the amplifier is activated before the switch is activated, and the switch is deactivated before the amplifier is deactivated.

19. A method of reducing noise leakage from a cable modem onto a cable plant the method comprising:
    activating a switch component and an amplifier in the cable modem by sending a control signal from an upstream transmitter directly to the switch component and the amplifier when the upstream transmitter is ready to transmit a data signal upstream;
    transmitting the data signal on the upstream channel;
    deactivating the switch component and the amplifier by sending the control signal from the upstream transmitter directly to the switch component and the amplifier after the data sigal has been transmitted on the upstream channel thereby reducing noise leakage when the cable modem is not actively transmitting and reducing noise from the cable plant when the cable modem is not powered;
    determining whether an amplifier in the cable modem can enable at a sufficient speed to not cause data loss; and
    activating and deactivating the switch component while activating the amplifier if the amplifier cannot enable at a sufficient speed.

20. An apparatus for reducing noise leakage from a cable modem onto a cable plant, the apparatus comprising:
    means for activating a switch component and an amplifier in the cable modem by sending a control signal from an upstream transmitter directly to the switch component and the amplifier when the upstream transmitter is ready to transit a data signal upstream;

means for transmitting the data signal on the upstream channel;

means for deactivating the switch component and the amplifier by sending the control signal from the upstream transmitter directly to the switch component and the amplifier after the data signal has been transmitted on the upstream channel thereby reducing noise leakage when the cable modem is not actively transmitting and reducing noise from the cable plant when the cable modem is not powered; and means or generating the control signal for implementing (i) a flint mode of protection from noise leakage using only the switch if the amplifier cannot switch at a sufficient speed not to cause data loss, and (ii) a second mode of protection from noise leakage using both the amplifier and the switch component if the amplifier can switch at a sufficient speed not to cause data loss.

21. The apparatus of claim 18 further comprising means for activating the switch component and the amplifier in a synchronized manner.

22. The apparatus of claim 18 wherein the amplifier is activated before the switch is activated, and the switch is deactivated before the amplifier is deactivated.

23. A method of reducing noise leakage from a cable modem onto a cable plant, the method comprising:

activating a switch component in the cable modem by sending a control signal from an upstream transmitter to the switch component when the upstream transmitter is ready to transmit a data signal upstream;

transmitting the data signal on the upstream channel;

deactivating the switch component by sending the control signal from the upstream transmitter to the switch component after the data signal has been transmitted on the upstream channel thereby reducing noise leakage when the cable modem is not actively transmitting and reducing noise from the cable plant when the cable modem is not powered;

determining whether an amplifier in the cable modem can enable at a sufficient speed to not case data loss; and activating and deactivating the switch component while activating the amplifier if the amplifier cant enable at a sufficient speed.

24. A method of reducing noise leakage from a cable modem onto a cable plant, the method comprising:

activating a switch component and an amplifier in the cable modem by sending a control signal from an upstream transmitter directly to the switch component and the amplifier when the upstream transmitter is ready to transmit a data signal upstream;

transmitting the data signal on the upstream channel;

deactivating the switch component and the amplifier by sending the control signal from the upstream transmitter directly to the switch component and the amplifier after the data signal has been transmitted on the upstream channel thereby reducing noise leakage when the cable modem is not actively transmitting and reducing noise from the cable plant when the cable modem is not powered;

activating the switch component while keeping the amplifier activated if it is determined that the amplifier is not able to be activated fast enough to receive data without causing data loss; and deactivating the switch component while keeping the amplifier activated if it is determined that the amplifier is not able to be deactivated fast enough to receive data without causing data loss.

25. An apparatus for reducing noise leakage from a cable modem onto a cable plat, the apparatus comprising:

means for activating a switch component and an amplifier in the cable modem by sending a control signal from an upstream transmitter directly to the switch component and the amplifier when the upstream transmitter is ready to transmit a data signal upstream;

means for transmitting the data signal on the upstream channel;

means for deactivating the switch component and the amplifier by sending the control signal from the upstream transmitter directly to the switch component and the amplifier after the data signal has been transmitted on the upstream channel thereby reducing noise leakage when the cable modem is not actively transmitting and reducing noise from the cable plant when the cable modem is not powered;

means for activating the switch component while keeping the amplifier activated if it is determined that the amplifier is not able to be activated fast enough to receive data without causing data loss; and means for deactivating the switch component while keeping the amplifier activated if it is determined that the amplifier is not able to be deactivated fist enough to receive data without causing data loss.

* * * * *